US008983396B2

(12) United States Patent
Nukala et al.

(10) Patent No.: US 8,983,396 B2
(45) Date of Patent: Mar. 17, 2015

(54) METHODS AND APPARATUS FOR PARAMETER ADJUSTMENT DURING MEASUREMENT GAPS

(76) Inventors: Gaurav Nukala, Cupertino, CA (US);
Giri Prassad Deivasigamani, Cupertino, CA (US); Srinivasan Vasudevan, Sunnyvale, CA (US); Muhammad A. Alam, San Jose, CA (US)

( * ) Notice: Subject to any disclaimer, the term of this patent is extended or adjusted under 35 U.S.C. 154(b) by 308 days.

(21) Appl. No.: 13/535,176

(22) Filed: Jun. 27, 2012

(65) Prior Publication Data
US 2013/0244719 A1   Sep. 19, 2013

Related U.S. Application Data

(60) Provisional application No. 61/612,884, filed on Mar. 19, 2012.

(51) Int. Cl.
*H04B 17/00* (2006.01)
*H04W 56/00* (2009.01)

(52) U.S. Cl.
CPC ................................ *H04W 56/0005* (2013.01)
USPC .................. 455/67.16; 455/67.11; 455/550.1; 455/517

(58) Field of Classification Search
CPC ............................ H04W 56/004; H04W 88/023
USPC ................ 455/550.1, 436, 452.1, 452.2, 517; 455/67.11, 515, 67.16, 552.1, 556.2; 370/337, 329, 335, 336

See application file for complete search history.

(56) References Cited

U.S. PATENT DOCUMENTS

| 2006/0072520 A1* | 4/2006 | Chitrapu et al. | 370/337 |
| 2008/0240028 A1* | 10/2008 | Ding et al. | 370/329 |
| 2012/0014371 A1* | 1/2012 | Weng et al. | 370/350 |

FOREIGN PATENT DOCUMENTS

| EP | 2234313 | 9/2010 |
| EP | 2408243 | 1/2012 |
| WO | WO2009135193 | 11/2009 |

OTHER PUBLICATIONS

PCT Application No. PCT/US2013/033015—International Search Report and Written Opinion dated Jul. 25, 2013.

* cited by examiner

*Primary Examiner* — John J Lee
(74) *Attorney, Agent, or Firm* — Womble Carlyle Sandridge & Rice, LLP (57) ABSTRACT

Methods and apparatus for parameter (e.g., timing) adjustment in a wireless network. In one embodiment, the timing adjustment includes detection and compensation for one or more missed adjustment messages. In one variant, for certain designated events, a client device may ignore a timer expiration, and apply a previously stored timing advance (TA) command. For example, a user equipment (UE) will determine if a TA command has been missed during a measurement gap interval (such as e.g., to perform measurements on an unsynchronized network), and reuse the previous TA command value. Reusing the TA command value introduces negligible error, which can be corrected in existing error correction capabilities (e.g., OFDM cyclic prefixes, etc.).

25 Claims, 5 Drawing Sheets

METHODS AND APPARATUS FOR PARAMETER ADJUSTMENT DURING MEASUREMENT GAPS

PRIORITY

This application claims priority to co-owned and co-pending U.S. Provisional Patent Application Ser. No. 61/612,884 filed Mar. 19, 2012 and entitled "METHODS AND APPARATUS FOR PARAMETER ADJUSTMENT DURING MEASUREMENT GAPS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication. More particularly, in one exemplary aspect, the invention is directed to methods and apparatus for parameter (e.g., timing adjustment) during client or other device measurement gaps.

2. Description of Related Technology

Within cellular networks, wireless signals experience a propagation time (propagation delay) transmitted from a user device to a base station. Certain cellular technologies correct for this propagation time with periodically exchanged adjustment commands.

For example, within the Long Term Evolution (LTE) standard, the uplink path (UL) is maintained by ensuring that the transmissions from different user equipment (UEs) in a cell are time aligned at the receiver of the evolved Node B (eNB). Time alignment ensures that multiple UEs can share the same single frequency by assigning sequential timeslots to each UE. Each UE ensures that its transmissions will arrive at the eNB only during their assigned timeslot. The timing of each UE is adjusted carefully to prevent collisions with adjacent users. The base station provides periodic Timing Advance (TA) commands to the UE.

In order to maintain synchronization, the UE expects a periodic TA command from the base station. If the UE does not receive the TA command within a specified time interval, the UE will assume it has lost synchronization and drop its radio connection. This is problematic from many perspectives, including reduced user experience.

Accordingly, improved methods and apparatus for adjusting timing within wireless networks with multiple users are needed.

SUMMARY OF THE INVENTION

The present invention provides, inter alia, apparatus and methods for timing adjustment in a wireless network, such as during client device measurement gaps.

In one aspect of the present invention, a method for detection and compensation of one or more missed messages is disclosed. In one exemplary embodiment, the messages are adjustment messages, and the method includes: receiving one or more adjustment messages from a first wireless network; disabling reception for the first wireless network for one or more time intervals; determining if one or more of the adjustment messages has been missed during the one or more time intervals of disabled reception; and when one or more adjustment messages have been missed, compensating for the missed one or more adjustment messages.

In another embodiment, the method includes: receiving one or more messages of a predetermined type from a first wireless network; disabling reception for the first wireless network for one or more time intervals; determining if one or more messages of the predetermined type has been missed during the one or more time intervals of disabled reception; and when the determining indicates that one or more messages of the predetermined type have been missed, compensating for the missed one or more adjustment messages.

In yet another embodiment, the method includes: receiving one or more messages from a first wireless network via a first wireless connection; enabling reception from a second wireless network via a second wireless connection; evaluating the sufficiency of at least the second connection; when it is determined, based at least on the evaluating, that the second connection is not sufficient, disabling the first connection for one or more time intervals; determining if one or more messages has been missed during the one or more time intervals; and when the determining indicates that one or more messages have been missed, compensating for the missed one or more messages.

In one variant, the aforementioned method is performed pursuant to a handover between two wireless networks.

In one exemplary implementation, the network is an LTE or LTE-A cellular network, and the adjustment messages are timing advance (TA) or other adjustment messages.

In a second aspect of the invention, an apparatus for detection and compensation of one or more missed adjustment messages is disclosed. In one embodiment, the apparatus includes one or more integrated circuits with associated logic included with in a mobile wireless device (e.g., LTE UE).

In a third aspect of the invention, a computer-readable storage apparatus is disclosed. In one embodiment, the apparatus includes computerized logic (e.g., a plurality of instructions executable on a processor) configured to: receive one or more adjustment messages from a first wireless network; disabling reception for the first wireless network for one or more time intervals; determining if one or more adjustment messages has been missed during the one or more time intervals of disabled reception; and if one or more adjustment messages have been missed, compensating for the missed one or more adjustment messages.

In a fourth aspect of the invention, a client device capable of detection and compensation of one or more missed adjustment messages is disclosed. In one embodiment, the client device is an LTE or LTE-A enabled mobile device such as a smartphone or tablet computer.

In another embodiment, the client device is a mobile wireless apparatus having: a wireless transceiver; a processor; and logic in communication with the processor and transceiver and configured to compensate for one or more missed adjustment messages so as to avoid an undesired response. In one implementation, the logic is configured to: receive a first adjustment message from a first wireless network; disable reception for the first wireless network for one or more time intervals; and determine if a second adjustment message has been missed during the one or more time intervals of disabled reception. When it has been determined that the second adjustment message has been missed, the logic compensates for the missed second adjustment message so as to avoid the undesired response.

In another aspect of the invention, a method for detection and compensation of parameter maintenance in a mobile wireless device is disclosed. In one embodiment, the method includes receiving a message associated with the parameter from a first wireless network, and subsequently determining if a message associated with the parameter has been missed during the one or more time intervals of disabled reception of the mobile wireless device. When the determining indicates that the messages associated with the parameter has been missed, the parameter is adjusted for the missed message utilizing at least the received message so as to avoid invoking one or more high-latency operations (e.g., lost connection/reconnection) necessary to explicitly determine the parameter.

Other features and advantages of the present invention will immediately be recognized by persons of ordinary skill in the art with reference to the attached drawings and detailed description of exemplary embodiments as given below.

All Figures © Copyright 2012 Apple Inc. All rights reserved.

DETAILED DESCRIPTION OF THE INVENTION

Reference is now made to the drawings, wherein like numerals refer to like parts throughout.
Overview—

In one exemplary embodiment of the present invention, a client device (such as for example an LTE-enabled UE) implements timing adjustment or correction, such as by ignoring a timer expiration for certain designated events, and applying a previously stored command (rather than implement less desirable alternatives, such as connection failure corrective actions). In one implementation, the UE can determine if a timing adjustment (TA) command has been missed during a measurement gap interval, and reuse the previous TA command value. This approach advantageously obviates the aforesaid connection failure-related actions, thereby preserving UE state and avoiding more comprehensive (and latent) remediation, such as due to "dropping" the connection.

In an alternative embodiment, the client device may reserve one or more receive chains for receiving messages from the network, even during measurement gap intervals.

Description of Exemplary Embodiments

Exemplary embodiments of the present invention are now described in detail. While these embodiments are primarily discussed in the context of cellular networks including without limitation, fourth generation (4G) Long Term Evolution (LTE) cellular networks, it will be recognized by those of ordinary skill that the present invention is not so limited. In fact, the various aspects of the invention are useful in and readily adapted to other cellular technologies including for example: Global System for Mobile Communications (GSM), General Radio Packet Service (GPRS), Enhanced Data Rates for GSM Evolution (EDGE), Universal Mobile Telecommunication System (UMTS), Long Term Evolution (LTE), LTE-Advanced (LTE-A), Interim Standard 95 (IS-95), Interim Standard 2000 (IS-2000, also referred to as CDMA-2000), CDMA 1XEV-DO, Time Division Single Carrier CDMA (TD-SCDMA), Time Division LTE (TD LTE), etc.

Timing Synchronization in Cellular Networks—

In the following discussion, an exemplary cellular radio system is described that includes a network of radio cells each served by a transmitting station, known as a cell site or base station (BS). The radio network provides wireless communications service for a plurality of mobile station (MS) devices. The network of BSs working in collaboration allows for wireless service, which is greater than the radio coverage provided by a single serving BS. The individual BSs are connected to a Core Network, which includes additional controllers for resource management and is in some cases capable of accessing other network systems (such as the Internet, other cellular networks, etc.).

Figure 1:
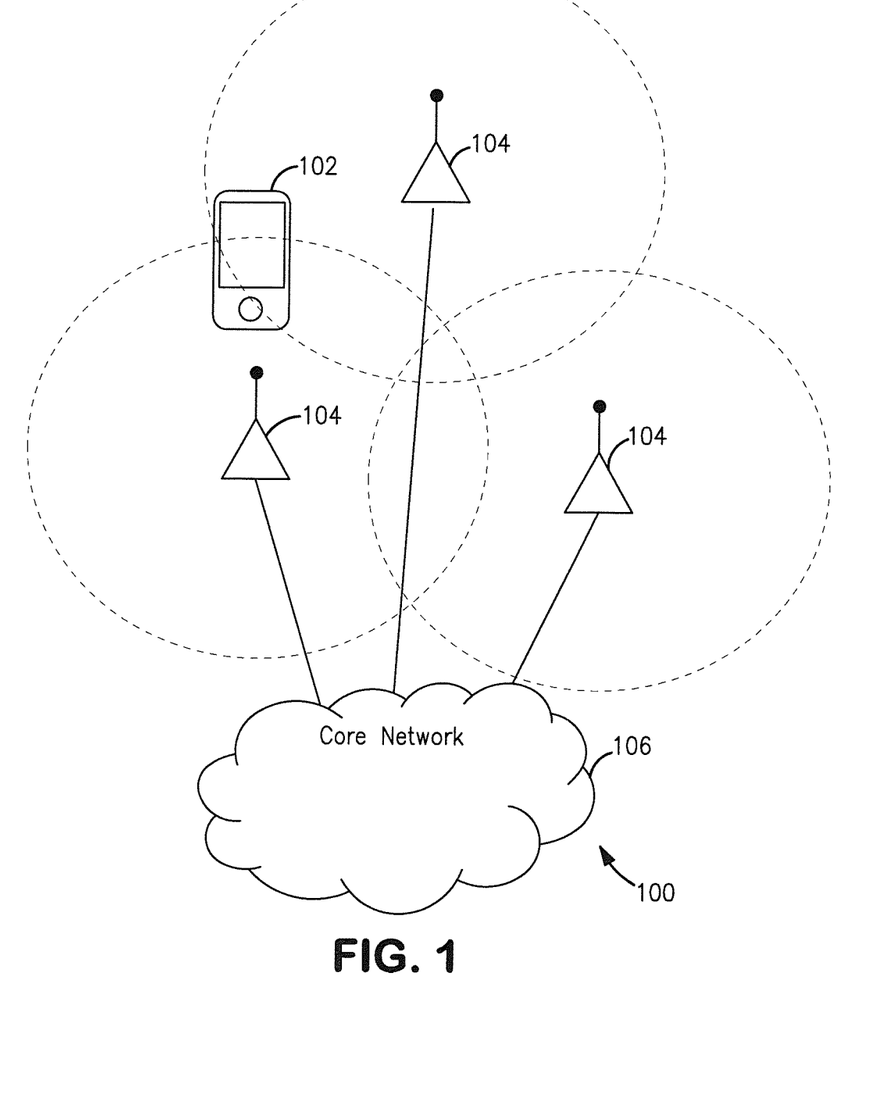
FIG. 1 is a graphical representation of one exemplary cellular network useful in illustrating various aspects of the present invention.

FIG. 1 illustrates one exemplary cellular network 100, with client devices 102, operating within the coverage of the Radio Access Network (RAN) provided by a number of base stations (BSs) 104. The Radio Access Network (RAN) is the collective body of base stations and associated network entities that are controlled by a Mobile Network Operator (MNO). The user interfaces to the RAN via the client devices, which in many typical usage cases is a cellular phone or smartphone. However, as used herein, the terms "mobile station", "mobile device", "client device", "user equipment", and "user device" may include, but are not limited to, cellular telephones, smart phones (such as for example the iPhone™ manufactured by the Assignee hereof), personal computers (PCs) and minicomputers, whether desktop, laptop, or otherwise, as well as mobile devices such as handheld computers, PDAs, personal media devices (PMDs), tablet computers (such as for example the iPad™ device manufactured by the Assignee hereof), or any combinations of the foregoing.

As shown in FIG. 1, the RAN is coupled to the Core Network 106 of the MNO e.g., via broadband access. The Core Network provides both routing and service capabilities. For example, a first client device 102 connected to a first base station 104 can communicate with a second client device connected to a second base station, via routing through the Core Network 106. Similarly, a client device can access other types of services e.g., the Internet, via the Core Network. The Core Network performs a wide variety of functions, including without limitation, authentication of client devices, authorization of client devices for various services, billing client devices for provisioned services, call routing, etc.

Figure 2:
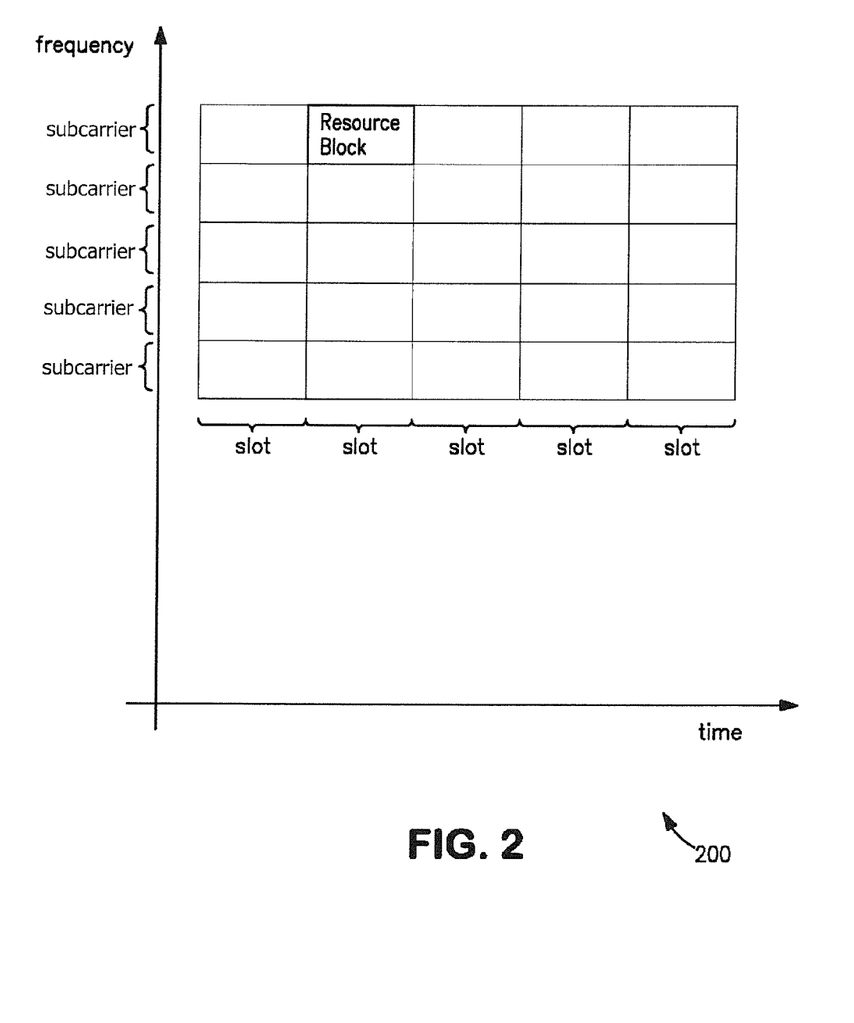
FIG. 2 is a graphical representation of one exemplary Orthogonal Frequency Division Multiple Access scheme useful in illustrating various aspects of the present invention.

For Long Term Evolution (LTE) cellular networks, the uplink (from the UE to the base station) and downlink (from the base station to the UE) paths utilize Orthogonal Frequency Division Multiple Access (OFDMA). Each UE is allocated one or more resource blocks (RBs) for transmission and/or reception. As illustrated in FIG. 2, one exemplary OFDM scheme is illustrated, as shown RBs are specified according to a subcarrier frequency band and a time slot. In practice, the UE and base station must maintain very accurate time and frequency synchronization to maintain orthogonality (i.e., so-called "orthogonal" transmissions will not overlap or interfere with other transmissions). Specifically, the UEs must be accurate enough to avoid interference from other UEs that are assigned RBs in consecutive time slots, and adjacent subcarriers.

Uplink timing alignment maintenance is in this exemplary context controlled by the medium access control (MAC) layer. The MAC layer must ensure that a UE's uplink transmissions arrive in the eNodeB without overlapping with transmissions from other UEs. To this end, the UE has a software MAC layer which communicates with the eNodeB counterpart MAC layer. The eNodeB MAC layer signals timing advance (TA) within a MAC layer protocol data unit (PDU) transmitted within a logical channel, with a logical channel identifier timing advance (LCID:TA). The UE periodically receives the LCID:TA PDU, and responsively adjusts its timing alignment. However, if the UE does not receive a LCID:TA PDU at the expected time interval, the UE will initiate corrective action. Specifically, if a timeAlignmentTimer expires without the UE receiving a LCID:TA PDU, then the UE will drop its radio link, and attempt to resynchronize. Each time the UE receives a valid LCID:TA PDU, the UE resets the timeAlignmentTimer, and adjusts timing according to the PDU.

Unfortunately, there are certain scenarios where a UE will miss a PDU for reasons entirely unrelated to loss of synchronization. For example, where a UE tunes away from the network to perform measurements on other nearby networks (e.g., to assist in handovers, etc.), the UE may miss a PDU. In another example, the UE may be operating in discontinuous reception (DRX) mode (where the UE powers off for predetermined time intervals to save power), and misses a PDU during an OFF cycle. In both of the foregoing scenarios, the UE has intentionally entered an operational mode which cannot receive a PDU. Prior art UEs will behave as if synchronization has been lost, and responsively attempt to reacquire timing synchronization. This unnecessary corrective action can result in, inter alia, radio link loss.

Accordingly, in one exemplary embodiment of the present invention, for certain designated events, a client device (e.g., LTE-enabled UE) may ignore a timer expiration, and apply the previously stored timing advance (TA) command. Specifically, a user equipment (UE) which maintains an active medium access control (MAC) layer software with a Long Term Evolution (LTE) network during measurement gap intervals, will determine if a TA command has been missed during a measurement gap interval, and reuse the previous TA command value. In actual practice, a measurement gap typically lasts on the order of 100-300 ms (milliseconds), although it should be appreciated that the measurement gap is random in nature and can be as high as several seconds; the current state of the TA after the measurement gap will not be much different from the previous value. Thus, reusing the TA command value introduces negligible error.

For example, consider a UE that is travelling at 100 km/h (kilometers per hour); the movement of the UE in 200 ms will be at most 5 m (meters), which corresponds to a change in propagation delay of 16 ns (nanoseconds). This difference in propagation delay can be corrected with existing UE mechanisms; for LTE, the cyclic prefix length is 4.69 µs (microseconds), which can handle path variations of up to 1.4 km (kilometers). Thus, the UE can safely disregard a missed TA command without significant impact to performance.

In a second exemplary embodiment, for certain designated events, a client device may reserve one or more receive chains for receiving messages from the network, even during measurement gap intervals. As used hereinafter, a "receive chain" refers generally and without limitation to the components necessary to demodulate and decode a received signal. Receive chains generally include: antennas and antenna periphery (e.g., switches, multiplexers, mixers, amplifiers, filters, etc.), and baseband processing subsystems (e.g., a radio modem, memory, etc.).

For example, UE can be equipped with multiple receive chains can tune a first receive chain to a measured radio access technology or RAT (i.e., the target RAT), while using a second receive chain for monitoring the currently registered RAT (i.e., the home RAT) for critical messaging. In one variant, the second receive chain is used when the RF condition of the target RAT is of sufficient quality that the first receive chain can perform all measurements without the assistance of the second receive chain.

Methods—

Figure 3:
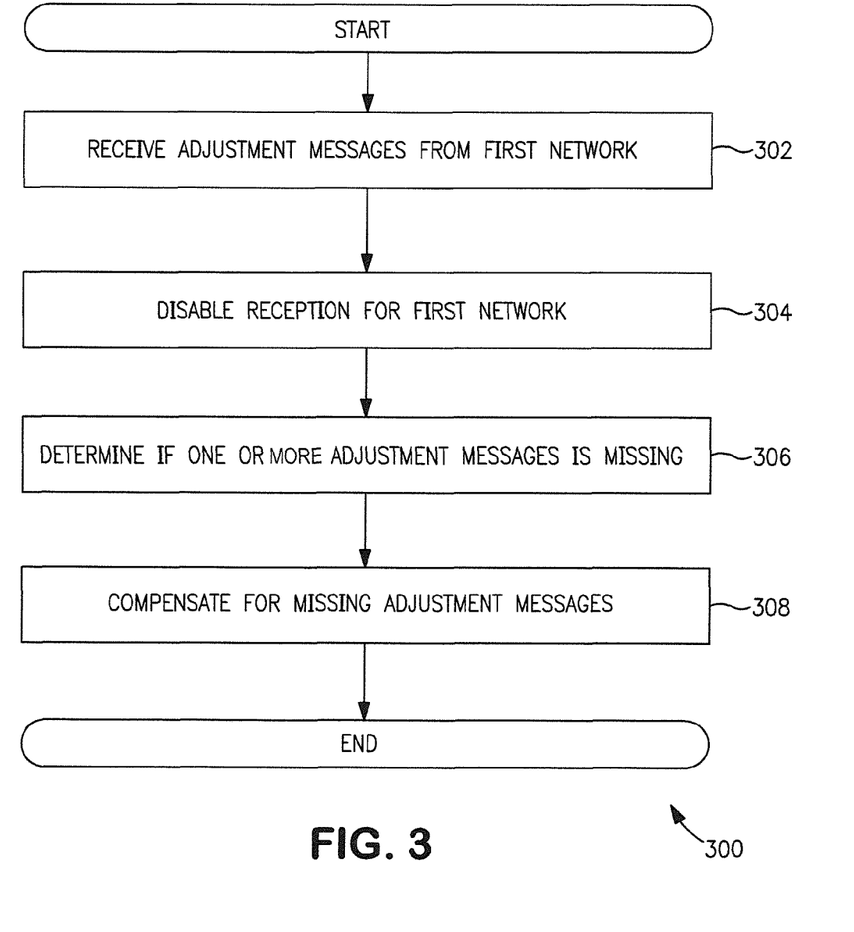
FIG. 3 is a logical flow diagram representing one embodiment of a generalized method for timing adjustment during client device measurement gaps, in accordance with one aspect of the present invention.

FIG. 3 is a logical flow diagram for one exemplary timing adjustment implemented during client device measurement gaps. While the following discussions are discussed with reference to Long Term Evolution (LTE) cellular networks, artisans of ordinary skill in the related arts will recognize that various aspects of the present disclosure are widely applicable to any client device which intentionally disables or defeats reception to perform other actions. Specifically, the various aspects of the present invention are broadly applicable to any use case where the client device intentionally disables reception. Common examples of the foregoing include, without limitation: (i) measurements of other networks, (ii) measurements of other radio access technologies (RATs), (iii) discontinuous reception and/or transmission, etc.

Moreover, while the following discussions are presented in view of a client device receiving messages from a wireless network, it is appreciated that the solutions described hereinafter are equally applicable to a wireless network or node (e.g., base station) receiving messages from a client device. For example, certain networking technologies may rely on control information generated by the client device for operation (e.g., a client device may provide periodic reports on other interfering networks, etc. which are not visible to the wireless network, etc.).

Furthermore, the following discussions relate generally to timing adjustment messaging, however it is appreciated that timing adjustment information is merely illustrative of the principles of the invention. Virtually any control information messaging may be used, including for example: frequency adjustment, power adjustment (e.g., power ramping), protocol adjustment, keep alive signaling, etc.

Referring now to FIG. 3, at step 302 of the method 300, a client device receives adjustment messages from a first wireless network. In one exemplary embodiment, the adjustment messaging includes timing advance (TA) commands transmitted from a Long Term. Evolution (LTE) Evolved Node B (eNodeB) to adjust the timing of the user equipment (UE).

As a brief aside, the LTE TA is based on estimates generated by the eNodeB of the transmission timing of the UE. TA commands are provided in a medium access control (MAC) layer message; the UE responsively adjusts its timing upon receipt of the TA command. Specifically, the UE adjusts the timing of its uplink transmission timing at sub-frame N+6 for a TA command received in sub-frame N. The UE adjusts the timing of its transmissions according to the received TA command value, which is compared to the timing of the preceding uplink transmission. In LTE systems, the TA command is relative to the current uplink timing (as observed by the eNodeB). In addition, each received TA command triggers a reset of a timeAlignmentTimer. In prior art UEs, if the timeAlignmentTimer is allowed to expire, then the UE will initiate corrective action to remedy synchronization loss.

In one implementation, the Timing Advance (TA) command MAC control element is identified by a MAC Protocol Data Unit (PDU) subheader with Logical Channel Identifier 11101. Each TA command has a fixed size, and consists of a single octet that encapsulates a 6 bit value TA command value; the TA command value indicates the appropriate amount of timing adjustment in discrete time increments (i.e., [0 . . . 63]).

Those of ordinary skill in the related arts will recognize that the foregoing commands (or similar) are widely used in a variety of related cellular network technologies, including without limitation: GSM, GPRS, EDGE, UMTS, LTE-A, TD-LTE, etc., the foregoing example of LTE being merely illustrative. More generally, most wireless networking technologies utilize frequent and periodic control signaling. For example, within CDMA type networks, the base station periodically transmits power messages. Similarly, other networks may transmit frequency alignment messaging, etc.

Returning to FIG. 3, at step 304, a client device disables reception for the first wireless network for one or more time intervals. In one exemplary embodiment, a LTE UE "tunes away" from its current LTE eNodeB to perform one or more measurements. Common examples of measurements include e.g., (i) measurements of nearby eNodeB to assist in cell selection, cell reselection, and handover decisions; (ii) measurements of other radio access technologies (RAT) to enable inter-RAT operation; (iii) power saving measures (e.g., discontinuous reception (DRX), discontinuous transmission (DTX)), etc.

For example, a LTE UE may tune away from its current home eNodeB to perform measurements on other Radio Access Technologies (RATS) for time periods typically near to 200 ms (empirically it has been shown that almost 90% of time periods are less than 200 ms). During these tune away periods, the UE cannot be reached by the eNodeB. Traditionally, the UE will not perform tune away operations during connected operation (during data transfers); moreover, paging intervals are longer than the measurement gaps, so as to successfully page an UE. However, control messaging (such as TA commands) can be dropped during these measurement gaps.

For example, in one exemplary embodiment, the UE may tune away from its current LTE network to perform measurements on an unsynchronized CDMA 1X network without LTE network intervention. Specifically, the LTE network is unaware of the UE's tune away schedule (during which the UE measures the CDMA 1X network). During the tune away period, the UE suspends its LTE software stack; once the UE has finished its appropriate tasks (e.g., measurements, paging channel decode, etc.), the UE can tune back to the LTE network and resume its LTE software stack. An example of such operation includes the so-called Suspend and Resume LTE (SRLTE) operation, developed by the Assignee hereof.

Still other examples of intentionally disabling reception include without limitation: repurposing hardware for scanning of other networks, reallocating processing resources for other tasks, improving power consumption, reducing interference with other components, implementing consumer or network imposed operational restrictions, etc.

At step 306 of the method 300, the client device determines if one or more adjustment messages has been missed during the one or more time intervals of disabled reception. In one embodiment, missing messages may be determined on the basis of a timer expiration. For example, within the exemplary context of a LTE UE, the UE monitors a timeAlignmentTimer. In alternate embodiments, missed messages may be identified on the basis of a skipped identifier (e.g., where each message is sequentially numbered, a missing number indicates a missed message). Still other embodiments, may identify missed messages on the basis of improper or incorrect context (e.g., where messages are cumulatively contextual, a message which has incorrect context is indicative of a missed message).

At step 308 of the method 300, the client device compensates for the missed one or more adjustment messages. In one exemplary embodiment, the client device replaces the one or more missed adjustment messages with a previously received message. For example, an LTE UE can use the last correctly received TA command. In some embodiments, the last correctly received TA command may have a maximum "stale" limitation. In other words, if a TA command has not been received for a maximum number of timer iterations, then the device reverts to a synchronization loss capacity. This approach is useful in helping to assure that the re-used TA value is not so far off the actual timing as to cause synchronization-related issues.

In other embodiments, if a TA command has not been received for a maximum time (regardless of number of timer iterations), the device reverts to a synchronization loss capacity. In some variants, the maximum stale limitation is dynamically and/or "intelligently" chosen, such as for example being based on information such as: e.g., last known location, last known direction of travel, last known velocity, last known reception quality, etc. For example, where a device was previously unmoved and in good reception, the maximum stale limitation may be quite long; whereas, for a device that was previously moving at through relatively poor reception, the maximum stale limitation may be shortened to reflect the higher possibility of synchronization loss.

In some exemplary implementations, the client device replaces the one or more missed adjustment messages according to an estimate of what the adjustment message may have been. Common schemes for estimation may be based on e.g., an average of a "rolling" history of previously received adjustment messages (e.g., a moving window of the last n TA messages received, or those received during a window of duration t). In some cases, the estimate may be further adjusted based on an extrapolation of e.g., hysteresis, and or change rate. In still other embodiments, the estimate may include various considerations, such as conservative safety margins, etc.

Figure 4:
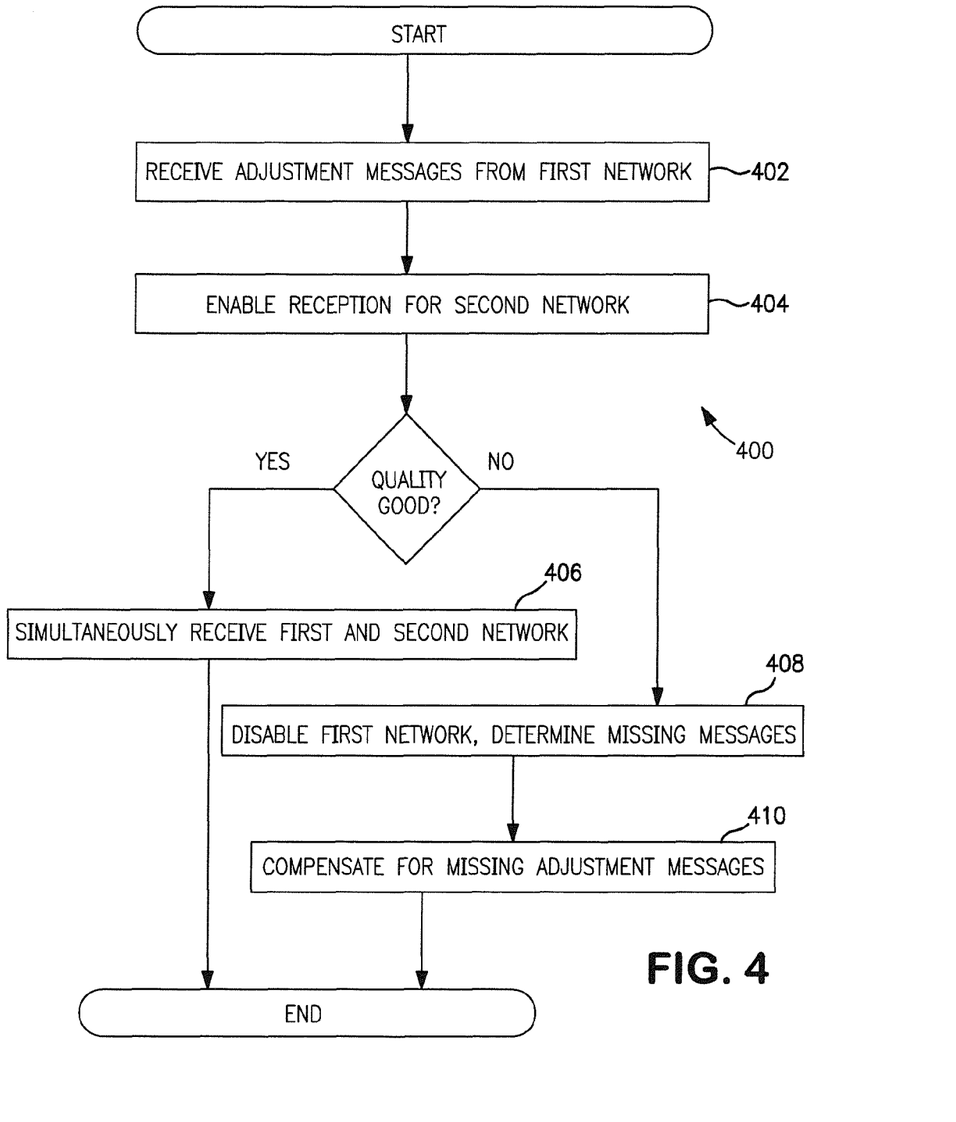
FIG. 4 is a logical flow diagram representing one exemplary implementation of a method for receiver operation during client device measurement gaps, in accordance with the present invention.

Referring now to FIG. 4, exemplary receiver operation during client device measurement gaps according to another embodiment of the invention is illustrated and described.

At step 402 of the method 400, a client device receives adjustment messages from a first wireless network. In one exemplary case, the adjustment messaging includes timing advance (TA) commands transmitted from a Long Term Evolution (LTE) Evolved Node B (eNodeB) to adjust the timing of the user equipment (UE).

The client device in this case has a number of receive chain resources. Consider a client device with a first receive chain (including an antenna, modem and baseband), and at least a second receive chain. The first and second receive chains can operate either in tandem or in isolation, where tandem operation significantly improves reception operation.

For example, Multiple Input Multiple Output (MIMO) and Multiple Input Single Output (MISO) based antenna schemes improve receiver operation by incorporating various spatial diversity schemes. In particular, each of the multiple receivers experiences a different reception channel having different reception characteristics. By combining the same signal received from each of the diversity antennas, the original signal can be reconstructed with significantly less noise and interference.

In other embodiments, the client device has a number of demodulation resources. Consider a client device which is based on processor iterations (or other processor resources). By increasing the number of processor iterations, overall performance can be improved; whereas poorer performance may be had with fewer iterations.

As used herein, "processing resources" may refer without limitation to components such as Digital Signal Processors, Fast Fourier Transforms (FFTs, or IFFTs), application processors, etc.; and/or compute resources such as processing time, processing power, etc.

At step 404 of the method 400, a client device enables reception for a second wireless network for one or more time intervals. In one exemplary variant, the client device allocates a second receive chain to the second wireless network, while retaining the first receive chain on the first wireless network.

In other implementations, the client device allocates a number of processing resources to the first and second wireless networks. In one such case, the number of processing resources is allocated according to a fixed or dynamic ratio. For example, in one scenario the first and second wireless networks are each allocated a fixed portion of the processing resources.

In alternate scenarios, the first and second wireless networks are allocated a dynamic portion of the processing resources based on e.g., reception quality, processing burden, etc. For example, if the second wireless network has sufficient reception quality, then the client device simultaneously receives signaling from both first and second wireless networks (step 406); otherwise, the client device disables reception for the first wireless network for the one or more time intervals.

At step 408 of the method 400, the client device determines if one or more adjustment messages has been missed during the time intervals of disabled reception. In one embodiment, missing messages may be determined on the basis of a timer expiration. In alternate embodiments, missed messages may be identified on the basis of a skipped identifier (e.g., where each message is sequentially numbered, a missing number indicates a missed message). Still other embodiments may identify missed messages on the basis of improper or incorrect context (e.g., where messages are cumulatively contextual, a message which has incorrect context is indicative of a missed message).

At step 410 of the method 400, the client device compensates for the missed one or more adjustment messages. In one exemplary implementation, the client device replaces the one or more missed adjustment messages with a previously received message. It will be appreciated that while the message immediately preceding the "missed" message is typically used for such replacement, the present invention contemplates use of other messages (e.g., the second- or third-to-last message, averages of several prior messages, etc.), in that the last prior message may be determined to be aberrant or defective in some regard, or not representative of actual timing.

In some embodiments, the client device replaces the one or more missed adjustment messages according to an estimate or extrapolation of what the adjustment message may have been, as previously described herein.

Apparatus—

Figure 5:
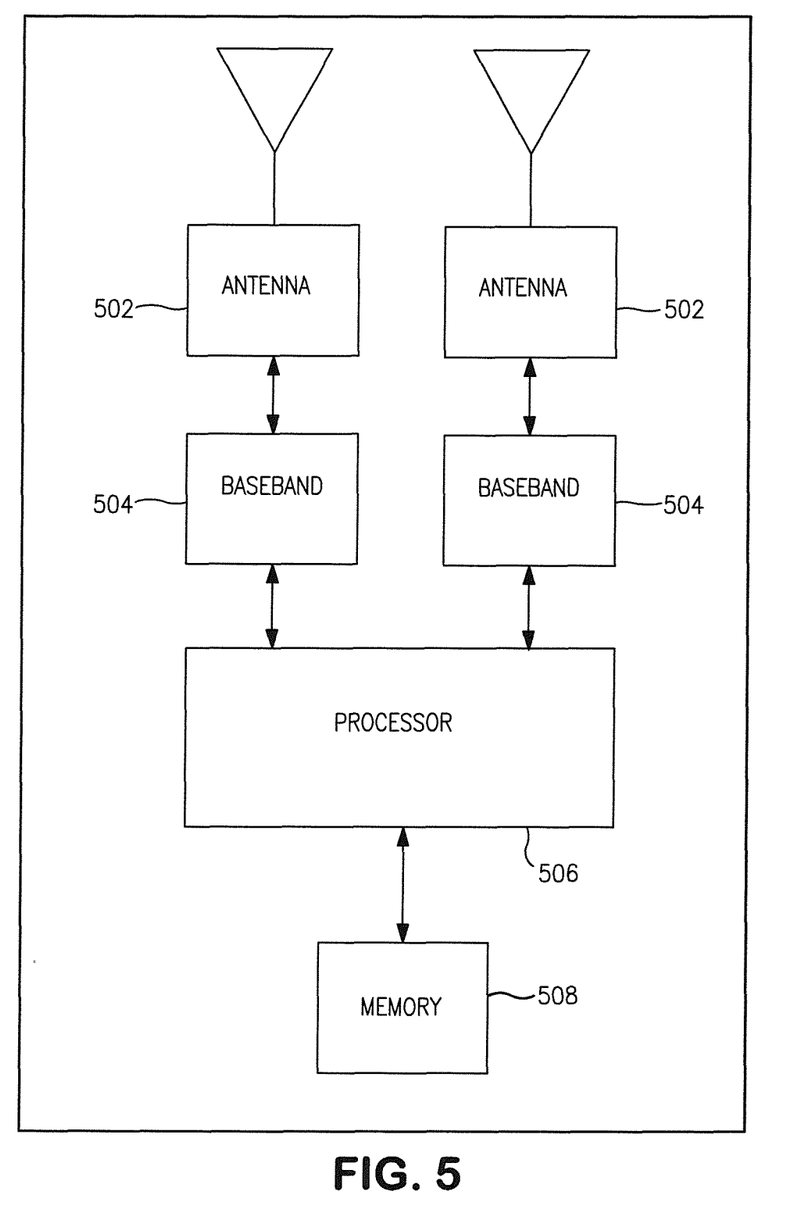
FIG. 5 is a graphical representation of one exemplary embodiment of a client device configured to implement various aspects of the present invention.

Referring now to FIG. 5, one exemplary client device 500 adapted for timing adjustment recovery during client device measurement gaps is illustrated. As used herein, the term "client device" includes, but is not limited to cellular telephones, smart phones (such as for example an iPhone™), wireless-enabled tablet devices (such as for example an iPad™), or any combinations of the foregoing. While one specific device configuration and layout is shown and discussed herein, it is recognized that many other configurations may be readily implemented by one of ordinary skill given the present disclosure, the apparatus 500 of FIG. 5 being merely illustrative of the broader principles of the invention.

The apparatus 500 of FIG. 5 includes a receive chain including an antenna modem assembly 502, and a baseband processor 504, an applications processor 506 and a computer readable memory subsystem 508.

The baseband processing subsystem 504 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 508, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The baseband processing subsystem 504 is adapted to receive one or more data streams from the modem 502. In an example embodiment the modem 502 is a LTE modem. Alternate embodiments may have multiple modems and baseband processing systems corresponding to each modem. In fact, the various aspects of the invention are useful in and readily adapted to any multi-mode combination of one or more of the following: General Radio Packet Service (GPRS), Enhanced Data Rates for GSM Evolution (EDGE), Universal Mobile Telecommunications System (UMTS), Long Term Evolution (LTE), LTE-Advanced (LTE-A), Interim Standard 95 (IS-95), Interim Standard 2000 (IS-2000, also referred to as CDMA-2000), CDMA 1XEV-DO, Time Division Single Carrier CDMA (TD-SCDMA), Time Division LTE (TD LTE), etc.

The application processing subsystem 506 includes one or more of central processing units (CPU) or digital processors, such as a microprocessor, digital signal processor, field-programmable gate array, RISC core, or plurality of processing components mounted on one or more substrates. The application processing subsystem is coupled to computer readable memory 508.

The application processing subsystem 506 is adapted to control overall operation of the device including, for example: multimedia processing, operating system controls, program management, baseband processor configuration and control, etc.

In one exemplary embodiment of the present invention, the memory subsystem additionally comprises instructions which when executed by the application processor, determines detects and compensates for one or more missed adjustment messages, such as according to the various exemplary schemes described supra.

Myriad other schemes for client-based (and/or network-based) capabilities management for detection and compensation of one or more missed adjustment messages will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A mobile apparatus, comprising:
   a wireless transceiver;
   a processor; and
   logic in communication with the processor and transceiver and configured to compensate for one or more missed adjustment messages to avoid an undesired response, the logic configured to cause the mobile apparatus to:
      receive a first adjustment message from a first wireless network;
      disable reception for the first wireless network for one or more time intervals after receipt of the first adjustment message;
      determine whether a second adjustment message is missed during the one or more time intervals of disabled reception; and
      when it has been determined that the second adjustment message is missed, compensate for the missed second adjustment message by using the received first adjustment message to avoid the undesired response.

2. The mobile apparatus of claim 1, wherein the mobile apparatus compensates for the missed second message by using the received first adjustment message in place of at least the missed second adjustment message.

3. The mobile apparatus of claim 1, wherein the mobile apparatus determines whether the second adjustment message is missed by determining whether any adjustment messages are scheduled to be received during any of the one or more time intervals of disabled reception.

4. The mobile apparatus of claim 1, wherein the mobile apparatus determines whether the second adjustment message is missed by identifying one or more missed message sequence numbers.

5. The mobile apparatus of claim 1, wherein the mobile apparatus determines whether the second adjustment message is missed by identifying an improper context associated with a third adjustment message received after the first adjustment message.

6. The mobile apparatus of claim 1, wherein the undesired response comprises the mobile apparatus invoking lost connection or reconnection procedures.

7. The mobile apparatus of claim 1, wherein:
   the mobile apparatus compensates for the missed second adjustment message by using the received first adjustment message in place of at least the missed second adjustment message; and
   the undesired response comprises the mobile apparatus invoking lost connection or reconnection procedures.

8. The mobile apparatus of claim 1, wherein avoidance of the undesired response eliminates a reconnection latency associated with a lost connection or reconnection procedure for the mobile apparatus.

9. The mobile apparatus of claim 1, wherein the mobile apparatus comprises a long term evolution (LTE) enabled cellular device, and the one or more time intervals of disabled reception comprise discontinuous reception (DRX) or discontinuous transmission (DTX) operation.

10. The mobile apparatus of claim 9, wherein the first adjustment message and the second adjustment message each comprise timing advance (TA) messages.

11. The mobile apparatus of claim 1, wherein the mobile apparatus compensates for the missed second adjustment message by extrapolating a timing adjustment associated with the missed second adjustment message based at least in part on the received first adjustment message.

12. A method for detection and compensation of one or more missed messages in a mobile wireless device, the method comprising the mobile wireless device:
   receiving one or more initial messages of a predetermined type from a first wireless network;
   disabling reception for the first wireless network for one or more time intervals after receipt of the one or more initial messages of the predetermined type;
   determining whether one or more additional messages of the predetermined type are missed during the one or more time intervals of disabled reception; and
   when the determining indicates that one or more additional messages of the predetermined type are missed during the one or more time intervals of disabled reception, compensating for the missed one or more additional messages of the predetermined type by using the received one or more initial messages of the predetermined type.

13. The method of claim 12, wherein the mobile wireless device compensates for the missed one or more additional messages of the predetermined type by using at least one of the received one or more initial messages of the predetermined type in place of at least one of the missed additional messages of the predetermined type.

14. The method of claim 12, wherein the mobile wireless device determines whether the one or more additional messages of the predetermined type are missed by determining whether any messages of the predetermined type are scheduled to be received during any of the one or more time intervals of disabled reception.

15. The method of claim 12, wherein the mobile wireless device determines whether the one or more additional messages of the predetermined type are missed by identifying one or more missed message sequence numbers.

16. The method of claim 12, wherein the mobile wireless device determines whether the one or more additional messages of the predetermined type are missed by identifying an improper context associated with a message of the predetermined type received after receipt of the one or more initial messages of the predetermined type.

17. The method of claim 12, wherein the compensating prevents the mobile wireless device from invoking lost connection or reconnection procedures for at least a period of time.

18. The method of claim 17, wherein the one or more additional messages of the predetermined type comprise a timing advance (TA) message.

19. The method of claim 18, wherein the mobile wireless device comprises a long term evolution (LTE) enabled cellular device, and the one or more time intervals of disabled reception comprise discontinuous reception (DRX) or discontinuous transmission (DTX) operation.

20. A method for detection and compensation of one or more missed messages in a mobile wireless device, the method comprising the mobile wireless device:
   receiving one or more initial messages from a first wireless network via a first wireless connection;
   enabling reception from a second wireless network via a second wireless connection;
   evaluating a sufficiency of at least the second wireless connection;
   when it is determined, based at least on the evaluating, that the second wireless connection is not sufficient, disabling the first wireless connection for one or more time intervals;
   determining whether one or more subsequent messages are missed during the one or more time intervals; and
   when the determining indicates that one or more subsequent messages are missed during the one or more time intervals, compensating for the missed one or more subsequent messages by using the received one or more initial messages.

21. The method of claim 20, wherein the first wireless network and the second wireless network comprise cellular networks, and the enabling of reception from the second wireless network occurs as part of a handover procedure for the mobile wireless device between the first wireless network and the second wireless network.

22. The method of claim 20, wherein the enabling of reception from the second wireless network occurs as part of the mobile wireless device evaluating the second wireless network.

23. The method of claim 20, wherein at least one of the first wireless network and the second wireless network comprises a long term evolution (LTE) enabled network, and the enabling of reception from the second wireless network occurs as part of a discontinuous reception (DRX) event of the mobile wireless device.

24. A method for detection and compensation of maintenance of a parameter in a mobile wireless device, the method comprising the mobile wireless device:
   receiving a message associated with the parameter from a first wireless network;
   subsequently determining whether another message associated with the parameter is missed during one or more time intervals of disabled reception of the mobile wireless device; and
   when the determining indicates that the another message associated with the parameter is missed, adjusting the parameter for the missed another message by utilizing at least the received message associated with the parameter to avoid invoking one or more high-latency operations necessary to explicitly determine the parameter.

25. The method of claim 24, wherein the parameter comprises a timing parameter, and the one or more time intervals of disabled reception are associated with a predetermined operation of the mobile wireless device.

* * * * *